United States Patent [19]

Rathmachers et al.

[11] Patent Number: 4,656,315

[45] Date of Patent: Apr. 7, 1987

[54] CONNECTOR ASSEMBLY WITH RESINOUS MATERIAL SECURING ELECTRICAL CABLE

[75] Inventors: Peter Rathmachers, Blieskastel; Bernd Donner, Saarbrücken, both of Fed. Rep. of Germany

[73] Assignee: Schaller Automation Industrielle Automationstechnik KG, Lieskastel, Fed. Rep. of Germany

[21] Appl. No.: 497,015

[22] Filed: May 23, 1983

[30] Foreign Application Priority Data

Jun. 11, 1982 [DE] Fed. Rep. of Germany ... 8217204[U]

[51] Int. Cl.⁴ .......................................... H02G 15/013
[52] U.S. Cl. ..................... 194/74 R; 174/23 R; 174/52 S; 174/152 R; 264/274; 339/102 R
[58] Field of Search ..................... 174/20, 22 R, 23 R, 174/52 S, 52 PE, 76, 77 R, 84 R, 88 R, 93, 151, 152 R; 264/274, 272.11; 338/269, 274, 275, 276; 339/62, 102 R, 102 L, 218 R, 218 M; 336/96; 361/306, 307

[56] References Cited

U.S. PATENT DOCUMENTS 3,251,018 5/1966 Bennett ..................... 264/272.11 X
3,435,107 3/1969 Conrad .......................... 264/274 X

FOREIGN PATENT DOCUMENTS 220308 2/1959 Australia ......................... 339/218 R
2338522 2/1975 Fed. Rep. of Germany .... 174/52 S
2416939 10/1975 Fed. Rep. of Germany ... 174/52 PE
879804 11/1942 France ............................ 174/152 R
1018184 10/1952 France ............................ 174/152 R
4761 of 1915 United Kingdom ............ 174/65 SS
556548 10/1943 United Kingdom ............ 339/218 R
756066 8/1956 United Kingdom .............. 174/52 S
959512 6/1964 United Kingdom .............. 174/23 R Primary Examiner—Laramie E. Askin
Attorney, Agent, or Firm—Kenyon & Kenyon

[57] ABSTRACT

An assembly for mechanically connecting an electrical cable to the housing of an electrical device comprises a cable jacket with an annular groove filled with a resinous substance such as polyurethane, the resin forming a prism fitted to an aperture in the device housing. The surface defining the groove is roughened and provided with a multiplicity of teeth.

14 Claims, 4 Drawing Figures

CONNECTOR ASSEMBLY WITH RESINOUS MATERIAL SECURING ELECTRICAL CABLE

BACKGROUND OF THE INVENTION

This invention relates generally to a connector assembly for mechanically attaching an electrical cable to the housing of an electrical device and more particularly to such an assembly wherein the cable is partially embedded in a resin material for protecting the electrical device against external influences such as moisture.

In a known connector assembly of the above-mentioned type (see German Open Patent Application Ser. No. 2,416,939) there is placed on the end of the cable, in the region of the cast resin, a sheet metal ring which is deeply constricted toward the center and has an inside diameter decreased towards the axis of the cable by pressing the two flange rims of the ring together, and which then engages the cable end in a firm press fit through constriction of the cable jacket. This sheet metal ring, together with the end of the cable, is embedded in cast resin material, so that a relatively good seal and mounting of the cable end in the housing of the electrical device can be obtained. A satisfactorily watertight cable lead-in or connection with suitable strain relief in case of high mechanical stress on the cable or in case of high external pressure, however, can be achieved only at high cost.

It is thus an object of the present invention to provide an improved cable connector assembly of the above-mentioned type.

SUMMARY OF THE INVENTION

In an improved cable connector assembly in accordance with the present invention the resinous material fills a circumferential or annular groove formed in the jacket of the cable. Casting resins as well as foam resins can be used here. To prevent damage in the interior of the cable, the groove has a cross section preferably in the shape of a circular segment. To ensure a sufficient mechanical strength and sealing action also under extreme conditions, it is advantageous if the surface of the cable jacket defining the groove or notch is roughened, particularly by grinding, e.g., with a grinding wheel. For this purpose it is also advantageous if the wall of the groove is profiled in sawtooth-fashion, as seen in cross section.

The joint between the roughened cable and the resin material depends in part on the compositions of the cable jacket and the resin material itself. It has been found to be especially advantageous if the cable jacket is made of PVC (polyvinylchloride) and the resin material of PU (polyurethane) foam.

DETAILED DESCRIPTION

Figure 1:
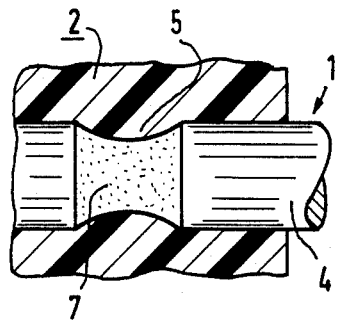
FIG. 1 is a partially cross-sectional side view of a cable connector assembly in accordance with this invention.
Figure 2:
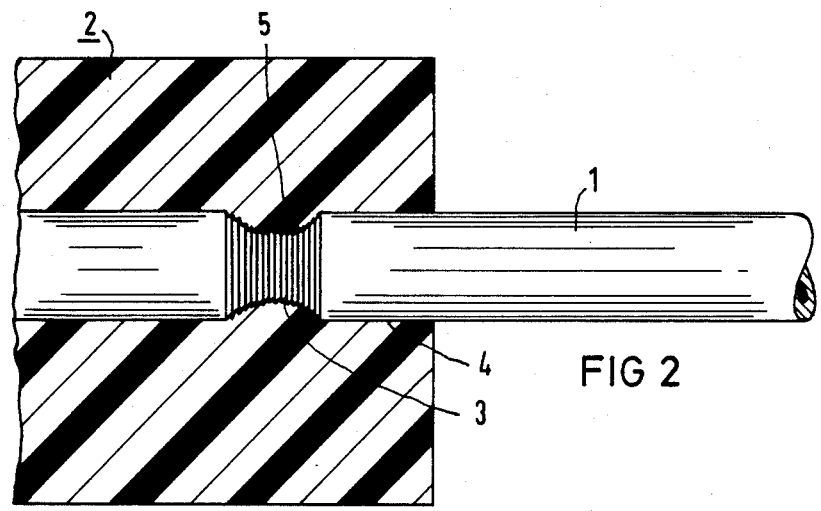
FIG. 2 is a view similar to FIG. 1 of the connector assembly illustrated in FIG. 1, with modifications in accordance with the present invention.

As illustrated in FIG. 1, a cable connector assembly in accordance with this invention comprises an annular groove 5 formed in the jacket 4 of an electrical cable 1 at an end thereof working into an unillustrated electrical device. The groove has in cross section the shape of a circular segment and is defined by a cross-sectionally arcuate annular surface 7 of cable jacket 4. Groove 5 is filled with a resinous material 2 such as a polyurethane foam which serves to prevent penetration through the connector assembly to the electrical device of moisture and other molecular and microscopic particles in the ambient air. As shown in FIG. 2, resinous material 2 may take the form of a block or prism having outer surfaces engageable in an air tight fit with aperture walls or surfaces (not illustrated) in the housing of the electrical device.

As indicated in FIG. 1, annular surface 7 is preferably rough, the roughening being accomplished, for example, by means of a grinding wheel. The roughened surface increases the adhesion of the resinous material 2 to surface 7, thereby improving the mechanical strength of the connection.

Figure 3:
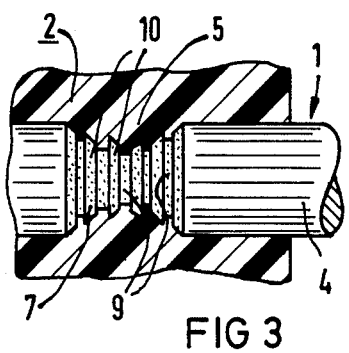
FIG. 3 is a view similar to FIGS. 1 and 2 of another embodiment of a cable connector assembly in accordance with this invention.

Mechanical strength of the connection may be further improved by providing cable jacket 4 with a multiplicity of small annular grooves or notches 9 at surface 7, as illustrated in FIG. 3. Notches 9 define a multiplicity of ribs 10 which appear as teeth disposed in an arcuate array in a cross section of annular surface 7.

Figure 4:
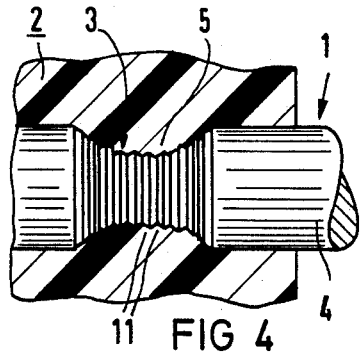
FIG. 4 is partially cross-sectioned side view on an enlarged scale of a connector assembly particularly similar to the assembly of FIG. 2.

The teeth in a cross section of surface 7 are preferably arranged in a sawtooth array 3, as shown in FIGS. 2 and 4. In FIG. 4, sawtooth profile 3 results from the formation in cable jacket at surface 7 (see FIG. 1) of a multiplicity of cross-sectionally V-shaped annular notches 11.

Cable jacket 4 is preferably made of polyvinylchloride. Where the cable jacket is polyvinylchloride and resinous material 2 is polyurethane, a cable connector in accordance with this invention can prevent leakage at pressures up to 10 atmospheres (or 10 bars). It is important to the effectiveness of the joint that surface 7 have a minimum roughness, so that an initimate connection of the two materials may be achieved.

What is claimed is:

1. In a connector assembly for securing, to the housing of an electrical device, an electrical cable having a cable jacket, the connector assembly including resinous material and a portion of the cable imbedded in the resinous material at least for protecting the electrical device against external influences such as moisture, the improvement wherein the cable jacket is provided at the imbedded portion of the electrical cable with an annular groove filled with the resinous material, said cable jacket having an annular surface defining at least a portion of said groove, said annular surface having a rough texture.

2. The connector assembly defined in claim 1 wherein said groove has, in a plane oriented parallel to the longitudinal dimension of said cable, a cross section substantially in the shape of a circular segment.

3. The connector assembly defined in claim 2 wherein said annular surface has a multiplicity of annular surface portions circumferentially contiguous and inclined with respect to adjacent surface portions to form in cross section a multiplicity of teeth, each of said surface portions having a rough texture.

4. The connector assembly defined in claim 3 wherein said annular surface has a curved sawtooth profile.

5. The connector assembly defined in claim 4 wherein said cable jacket is made of polyvinylchloride and said resinous material is polyurethane foam.

6. The connector assembly defined in claim 2 wherein said cable jacket is made of polyvinylchloride and said resinous material is polyurethane foam.

7. The connector assembly defined in claim 1 wherein said annular surface has in cross section a multiplicity of teeth.

8. The connector assembly defined in claim 7 wherein said annular surface has a curved sawtooth profile.

9. The connector assembly defined in claim 8 wherein said cable jacket is made of polyvinylchloride and said resinous material is polyurethane foam.

10. The connector assembly defined in claim 7 wherein said cable jacket is made of polyvinylchloride and said resinous material is polyurethane foam.

11. The connector assembly defined in claim 1 wherein said cable jacket is made of polyvinylchloride and said resinous material is polyurethane foam.

12. In a connector assembly for securing, to the housing of an electrical device, an electrical cable having a cable jacket, the connector assembly including resinous material and a portion of the cable imbedded in the resinous material at least for protecting the eletrical device against external influences such as moisture, the improvement wherein the cable jacket is provided at the imbedded portion of the electrical cable with an annular groove filled with the resinous material, said groove having, in a plane oriented parallel to the longitudinal dimension of said cable, a cross section substantially in the shape of a circular segment, said groove being defined by an annular surface having in cross section a multiplicity of teeth.

13. The connector assembly defined in claim 12 wherein said annular surface has a curved sawtooth profile.

14. The connector assembly defined in claim 12 wherein said cable jacket is made of polyvinylchloride and said resinous material is a polyurethane foam.

* * * * *